(12) United States Patent
Stolitzka et al.

(10) Patent No.: US 6,327,688 B1
(45) Date of Patent: Dec. 4, 2001

(54) DATA BUS WITH AUTOMATIC DATA INTEGRITY VERIFICATION AND VERIFICATION METHOD

(75) Inventors: Dale Stolitzka, Los Altos, CA (US); Robert A. Dunstan, Forest Grove, OR (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/130,666

(22) Filed: Aug. 7, 1998

(51) Int. Cl.[7] ............................... H04L 1/14; G06F 11/00
(52) U.S. Cl. .................... 714/750; 714/18; 714/751; 714/776
(58) Field of Search .................................. 714/751, 776, 714/18, 781, 750

(56) References Cited

U.S. PATENT DOCUMENTS

| | | | |
|---|---|---|---|
| 5,335,233 | * | 8/1994 | Nagy ................................. 714/748 |
| 5,428,766 | * | 6/1995 | Seaman . |
| 5,664,105 | * | 9/1997 | Keisling et al. ..................... 709/224 |
| 5,745,502 | * | 4/1998 | Khayrallah et al. ................. 714/751 |
| 5,754,754 | * | 5/1998 | Dudley et al. ........................ 714/18 |
| 6,014,767 | * | 1/2000 | Glaise ................................. 714/776 |

* cited by examiner

Primary Examiner—Ly V. Hua
(74) Attorney, Agent, or Firm—Koppel & Jacobs

(57) ABSTRACT

A data bus system with data integrity verification is arranged so that a bus device receiving a message always responds by sending a check sequence back to the message originating device; i.e., a check sequence is automatically returned to a message originating device as part of every bus transaction. The originating device reads the returned check sequence and uses it to verify the integrity of the data transferred between the two devices. The check sequence can be created by the receiving device based on the data conveyed, or the receiving device can simply echo back a check sequence that is appended to the incoming data.

23 Claims, 6 Drawing Sheets

DATA BUS WITH AUTOMATIC DATA INTEGRITY VERIFICATION AND VERIFICATION METHOD

BACKGROUND OF THE INVENTION

1. Field of the Invention

This invention relates to the field of data busses, and particularly to schemes for verifying the integrity of data conveyed on a data bus.

2. Description of the Related Art

Data busses, found in virtually all computers and computer-based products, are used to convey data between devices connected to the bus. When data is conveyed from an originating device to a receiving device, there exists the possibility that the data will become corrupted en route.

Various schemes have been developed to alleviate this problem. For example, various handshaking protocols exist which require a device to which a message is sent to acknowledge the message's receipt by sending an acknowledgment message back to the message originating device. Though effective for verifying that some kind of data was received, this technique does nothing to insure that the data was received correctly; i.e., it does not verify the integrity of the data conveyed between the devices.

Schemes that do verify the integrity of conveyed data typically involve the use of some type of "check sequence", i.e., one or more data bits that have a value based on the data conveyed. For example, a "parity bit" may be allotted a slot in a message, which is set high or low depending on the number of "1's" or "0's" in the message. When the message is received, the receiving device counts the message's "1's" or "0's" as appropriate, determines what the parity bit should be, and compares it with the bit received to determine the integrity of the message.

An extension of the parity bit approach requires the appending of a multi-bit check sequence to a message being sent. The value of the check sequence is calculated in a known manner based on the bits of the message. When the message is received, the same calculation is applied to the bits of the received message to determine what the check sequence should be. This predicted check sequence is compared to the received check sequence to determine message integrity.

Several methods are used to verify the integrity of conveyed data when a check sequence is employed. For example, when the check sequence calculated by the receiving device does not match that sent by the message originating device, the receiving device can send a message back to the originating device indicating that the message was not properly received. Such a message typically includes a "header", i.e., one or more bytes of overhead data that precede the actual message, and requires the receiving device to arbitrate for the bus. Alternatively, the originating device can send a message to the receiving device asking that the received data be read back, or that a message status byte—with accompanying header—be sent. In either case, the originating device is unable to actively verify that a message is received correctly without a subsequent bus operation; i.e., data verification requires a minimum of two bus operations.

Because the above-described data integrity verification methods require multiple bus operations, message headers, and/or bus arbitration, they occupy the bus for a considerable amount of time, resulting in a bandwidth requirement that may be unacceptably high—particularly for busses intended for use in battery-powered products such as cellular phones or handheld computers for which low-cost bus devices are preferred.

A need exists for a data bus system that provides data integrity verification without requiring excessive bandwidth and which is compatible with low-cost bus devices.

SUMMARY OF THE INVENTION

A data bus system with data integrity verification and a verification method are presented which meet the needs stated above. The system and method provide a high degree of data integrity, use less bandwidth than prior art schemes, and operate effectively with low-cost bus devices.

The data bus system is arranged so that a bus device receiving a message always responds by sending a check sequence back to the message originating device; i.e., a check sequence is automatically returned to a message originating device as part of every bus transaction. The originating device then reads the check sequence and uses it to verify the integrity of the data transferred between the two devices.

The check sequences that are automatically sent by receiving devices on the bus can be, for example, a cyclical redundancy code (CRC), a checksum, a longitudinal redundancy check (LRC), or a parity bit. The check sequence can be created by the receiving device based on the data received or requested, or the receiving device can simply echo back a check sequence that is appended to the incoming data.

The returned check sequence is made an integral part of each bus transaction, eliminating the need to perform two bus operations to insure data integrity and thereby lessening the bus bandwidth required by prior art schemes. Also, the integrity verification is performed by the originating device, so that receiving devices need not include verification or error correction capabilities—enabling the system's use with low-cost bus devices.

The data bus system with automatic data integrity verification is effectively employed with various broadcast-type bus configurations, with single or multi-wire busses, and even with topologies such as a token ring network, and is equally applicable to fixed block or variable length message protocols.

Further features and advantages of the invention will be apparent to those skilled in the art from the following detailed description, taken together with the accompanying drawings.

DETAILED DESCRIPTION OF THE INVENTION

Figure 1A:
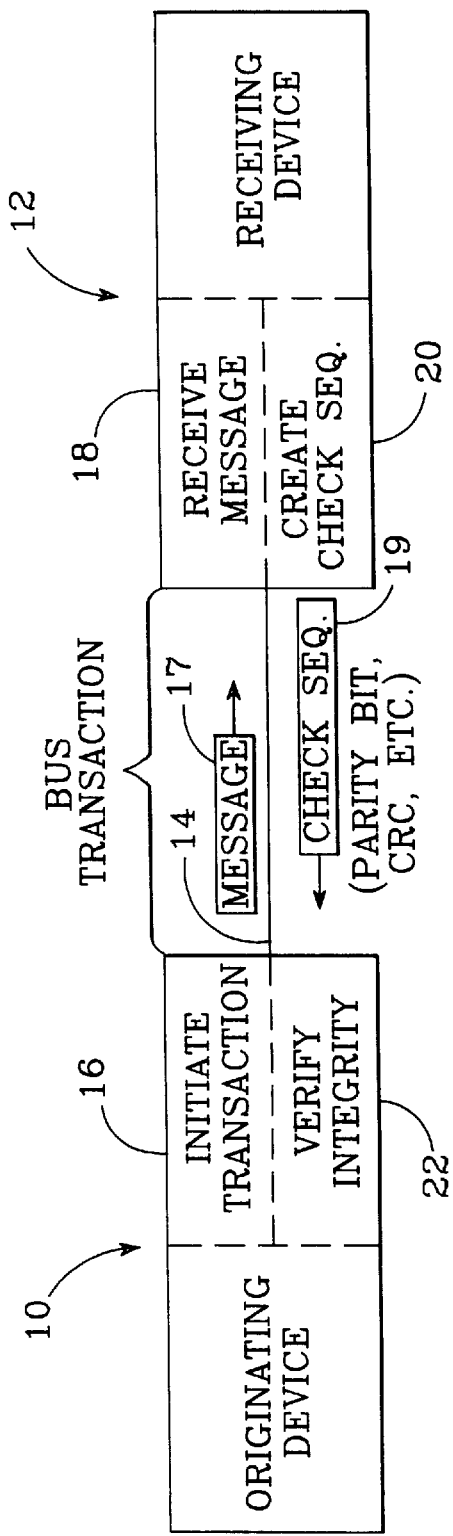
FIG. 1a is a block diagram of a data bus system which includes a data integrity verification scheme per the present invention.

A data bus system which includes a data integrity verification scheme is shown in FIG. 1a. An originating device 10 and a receiving device 12 are connected together via a data bus 14, with the data bus system arranged to conduct "bus transactions", i.e., operations in which data is conveyed from one device to the other over the bus, between the devices.

An essential aspect of the data bus system is that message receiving device 12 sends a check sequence back to message originating device 10 as part of every bus transaction. When the check sequence is received by the originating device, it can be used to verify the integrity of the data conveyed between the two devices. Only a single check sequence is needed (for a given message length) to insure data integrity; no lengthy "bad data" message need be sent by a receiving device that must first arbitrate for the bus, nor does the originating device need to inquire as to the status of the last message—both of these prior art techniques consume more bandwidth than the scheme described herein. Here, the data bus system defines a bus transaction as including the automatic return of a check sequence to the originating device from the receiving device, so that data integrity verification is accomplished with a single bus operation. A data exchange sequence per the present invention is shown in FIG. 1a. The originating device 10 initiates a bus transaction 16 with receiving device 12 by addressing a message 17 to it. Device 12 receives the message (18). A check sequence 19 is then automatically created (20) and sent back to originating device 10. The check sequence 19 is received by device 10 and used to verify the integrity of the data exchanged between the devices (122), using techniques well-known to those familiar with the field of data transmission.

Figure 1B:
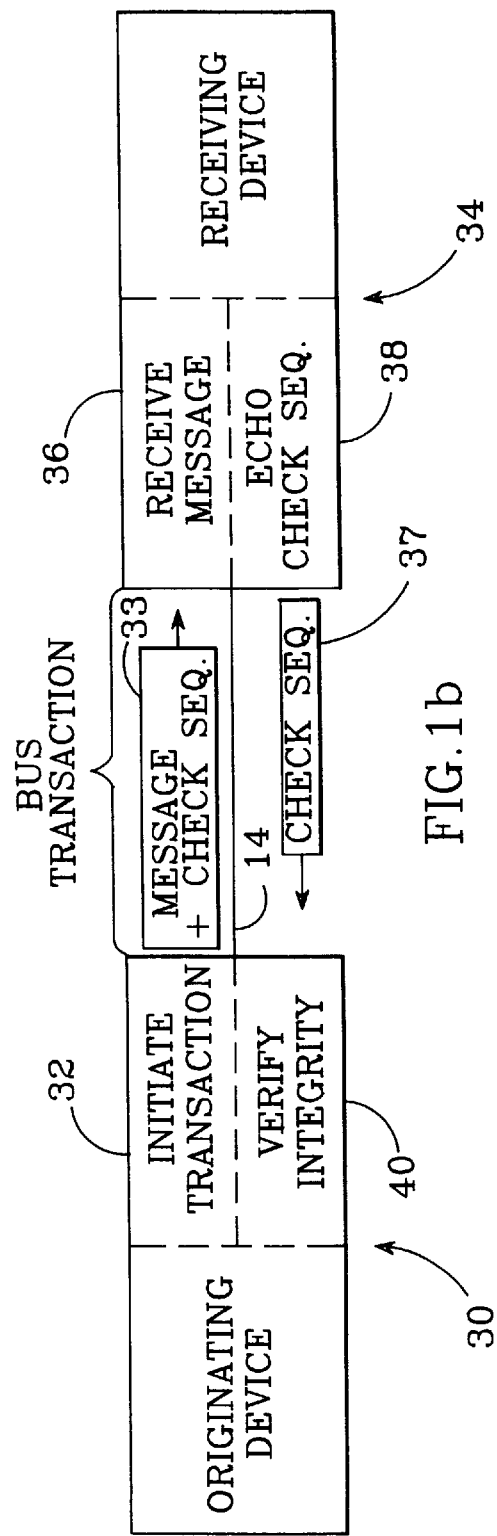
FIG. 1b is a block diagram of a data bus system which includes a data integrity verification scheme employing an echoed check sequence.

In FIG. 1a, the receiving device 12 may include circuitry and/or software which creates the check sequence based on data (other than the check sequence) conveyed between the devices. Types of check sequences suitable for data integrity verification include parity bits, checksums or CRCs. An alternative to this approach is shown in FIG. 1b. Here, an originating device 30 initiates a bus transaction (32) by addressing a message 33 to a receiving device 34, with the message sent having a check sequence appended to it. The receiving device receives the message (36), but rather than creating a responsive check sequence, the appended check sequence 37 is simply echoed back (38) to the originating device 30, where it can be used to verify the integrity of the data exchanged between the devices (40). No calculations are required to generate the echoed check sequence, and thus hardware and/or software for performing such a calculation is not needed in the receiving device. This approach is favored if it is desired to keep receiving device hardware to a minimum.

Figure 1C:
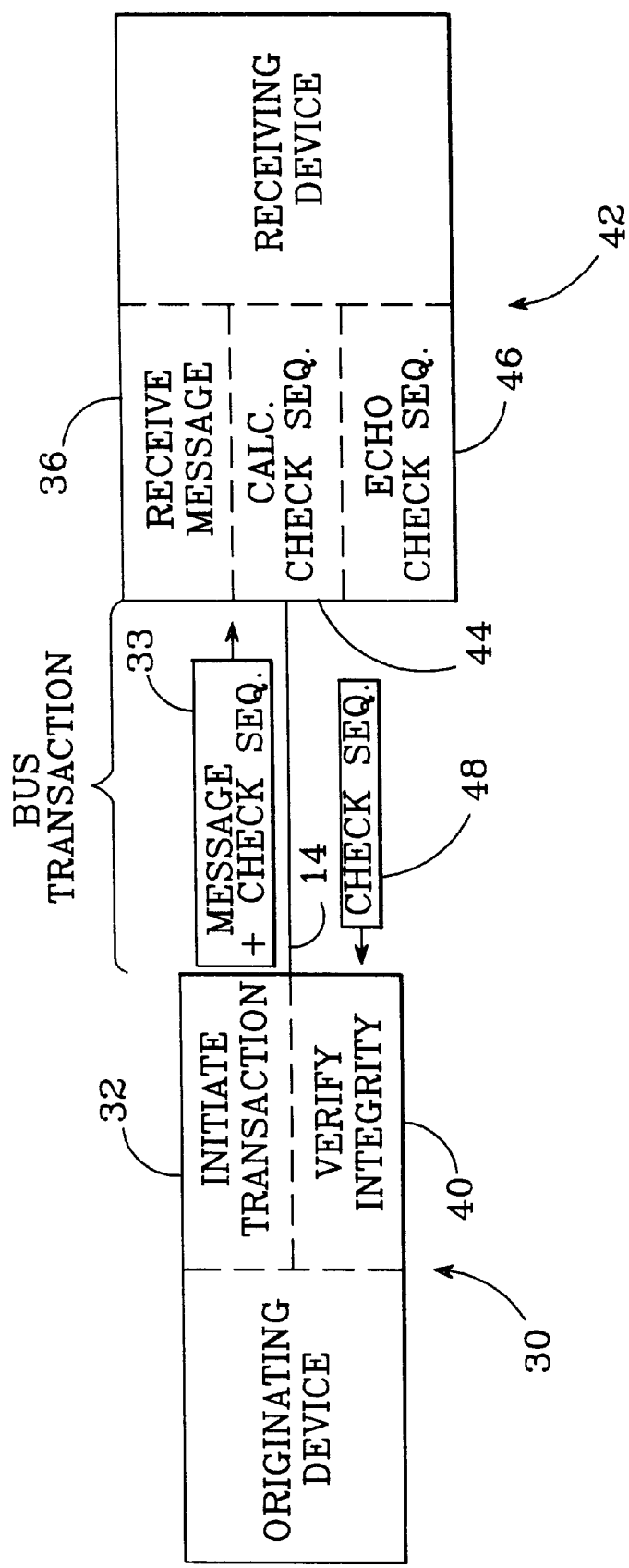
FIG. 1c is a block diagram of a data bus system which includes an alternative data integrity verification scheme employing an echoed check sequence.

The data bus system in FIG. 1b employs an echoed check sequence which provides a some measure of data integrity. A higher level of data integrity is provided with the alternative system shown in FIG. 1c. As in FIG. 1b, originating device 30 sends a message with appended check sequence 33 to a receiving device 42. Here, however, receiving device 42 includes hardware and/or software which calculates a check sequence (44) based on the received message. If the calculated sequence matches the appended sequence, the receiving device can echo (46) the appended check sequence 48 back to the originating device. If the two check sequences do not match, the receiving device preferably indicates this to the originating device by automatically sending an agreed-upon "fail" check sequence, such as an all "0" or all "1" sequence. The check sequence sent to the originating device for either a successful or failed bus transaction is established by the bus protocol implemented for the data bus system. Though the system in FIG. 1c requires the receiving device to include capabilities not needed in the FIG. 1b system, it does provide a higher level of data integrity because the receiving device gets the check sequence, calculates a match, and tells the originating device that its message was received intact in one atomic operation.

In both FIGS. 1a and 1b, then, a receiving device that receives data from an originating device automatically returns a check sequence to the originating device, which can use the returned check sequence to verify the integrity of the data conveyed.

Figure 2:
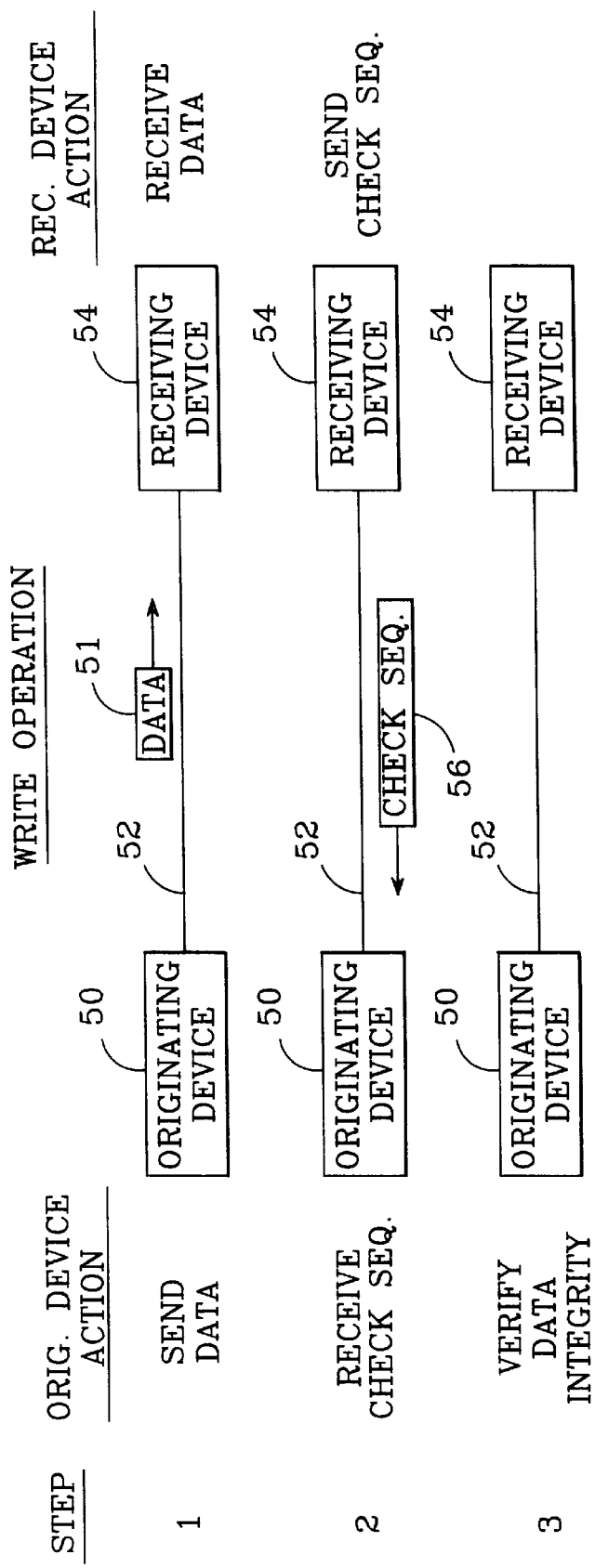
FIG. 2 is a block diagram that depicts the execution of a write operation as performed per the present invention.

One bus transaction which incorporates this data integrity scheme is illustrated in FIG. 2: a "write operation". First, an originating device 50 initiates the transaction by sending data 51 over a data bus 52 to a receiving device 54 (STEP 1). The receiving device 54 responds by sending a check sequence 56 back to originating device 50; the originating device 50 receives check sequence 56 and the bus transaction ends (STEP 2). The originating device can now inspect check sequence 56 to determine whether data 51 was successfully received by receiving device 54 (STEP 3). As noted above, the data bus system can be arranged so that check sequence 56 is created by receiving device 54 based on data 51, or that check sequence 56 is an echo of a check sequence appended to data 51 by originating device 50.

A "check sequence" as used herein can represent the data component of any data integrity scheme, such as a CRC (including 8, 16, and 32 bit versions), a checksum, a longitudinal redundancy check (LRC), or a single parity bit. Factors to consider when choosing a particular type of check sequence include bus bandwidth (longer check sequences require greater bandwidth) and receiving device complexity (for example, a CRC calculation requires more device sophistication than would a parity bit). An echoed check sequence scheme imposes the least burden on a receiving device, shifting the burden of calculating the check sequence to the originating device.

Another consideration is the desired level of confidence in the integrity of the conveyed data. For example, an 8-bit CRC may provide a high level of confidence in the integrity of a relatively short 16-byte message, but could be inadequate for longer messages. Longer CRCs, such as CRC-16 or CRC-CCITT might be more suitable in some applications.

Note that when a CRC-type check sequence is employed, since the CRC is always sent back to the originating device by the receiving device, there is no requirement for error correction circuitry in the receiving device. This further reduces the burden on the system's receiving devices and permits the use of lower-cost (non-error-correcting) bus devices.

If the originating device receives a responsive check sequence that indicates that the conveyed data is "bad"; i.e., corrupted in some way, it can opt to retransmit the data sent (if a write operation), request that data be re-sent (read operation), ignore the data received, or do nothing. These options are implementation-specific.

As noted above, the data bus system and data integrity verification method described herein are particularly beneficial when used with low-cost bus devices. Such devices are typically used with one-wire data busses in products such as cellular phones and handheld computers. The invention is not limited to any particular type of bus, however. Rather, it is applicable to any data bus system which requires a method of insuring the integrity of the data conveyed between the devices connected to the bus.

Figure 3A:
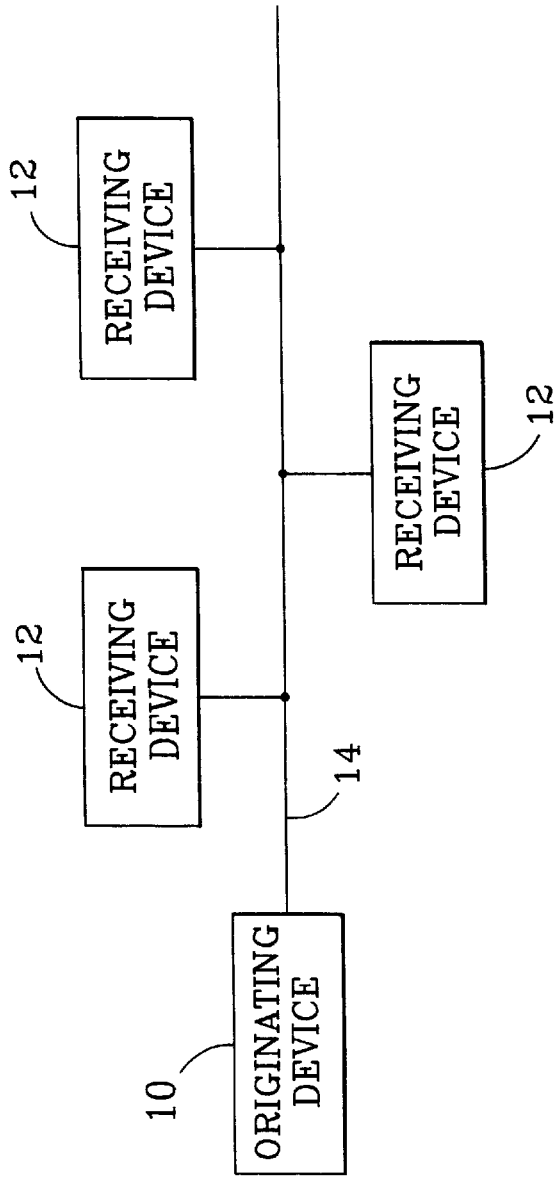
FIGS. 3a and 3b are block diagrams of the present invention as implemented in two alternative broadcast bus configurations.

FIG. 1 depicts a data bus configuration in which a single host (message originating device 10) communicates with a single client (message receiving device 12). The invention is equally applicable to other bus configurations. FIG. 3a depicts a broadcast bus which includes a single message originating device 10 and three receiving devices 12. Per the present invention, each of receiving devices 12 is arranged to send a check sequence back to originating device 10 for each bus transaction in which the respective device is involved.

Figure 3B:
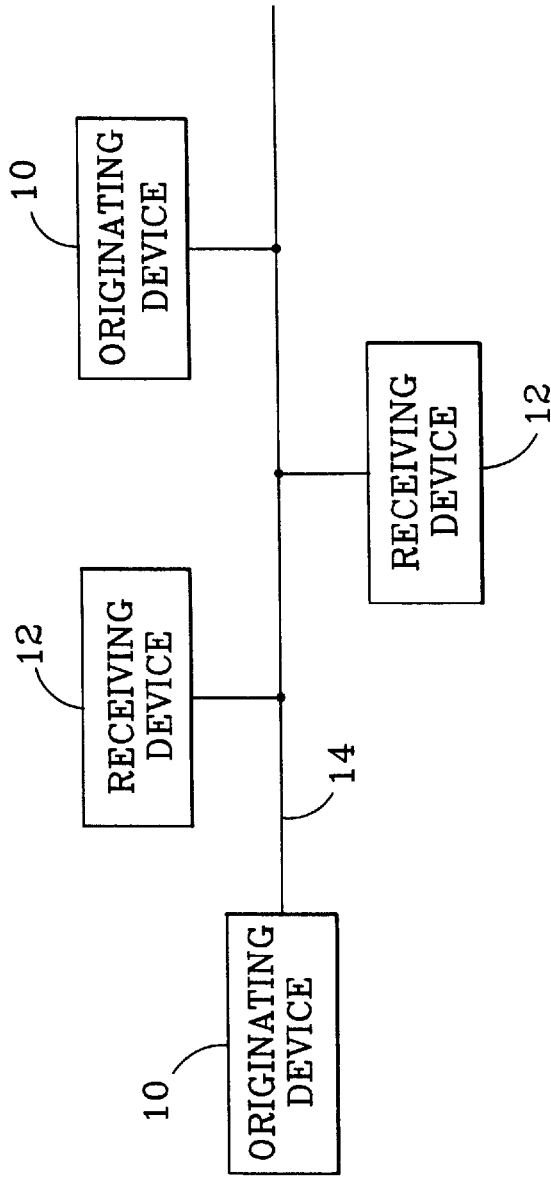

The invention is employed in yet another broadcast bus configuration in FIG. 3b, which includes more than one originating device 10 capable of mastering the bus for sending messages. As with the bus systems described above, each receiving device 12 involved in a bus transaction automatically returns a check sequence to the originating device that initiated the transaction.

A data bus system per the present invention is useful with a number of possible message protocols. The discussion above has described the receiving devices as returning check sequences for each bus transaction in which they are involved. In practice, more than one check sequence may be returned during a given bus transaction—depending on the length and/or number of messages conveyed. The frequency with which check sequences should be returned depends on various factors, such as the desired confidence level in the integrity of the data conveyed, and the bus bandwidth to be allocated to data integrity verification.

Figure 4A:
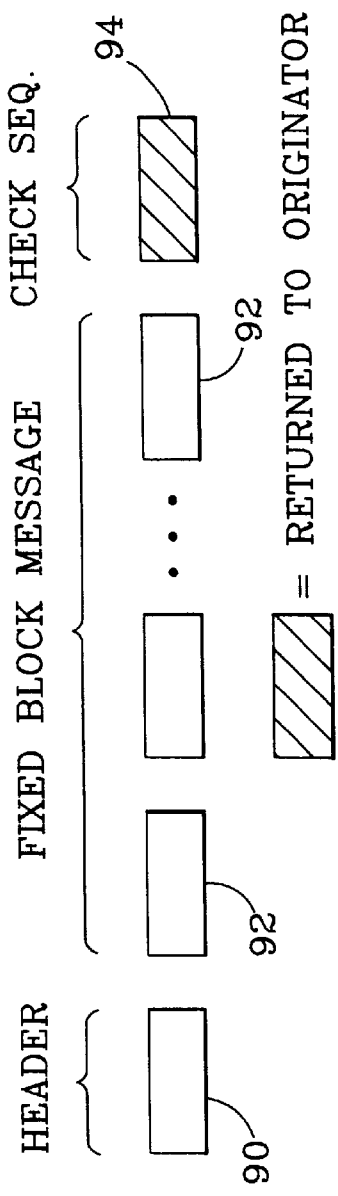
FIGS. 4a and 4b are diagrams of a fixed block message and a multi-block fixed block message, respectively, per the present invention.

A "fixed block protocol" as might be used with a bus system per the present invention is shown in FIG. 4a. A message per this protocol typically includes a header 90 which specifies overhead information such as the address of the receiving device, followed by a fixed amount of data typically defined as a particular number of bytes 92. Upon receipt of the last byte of the fixed block message (or transmission of the last message byte if a read operation is being performed), the receiving device automatically returns a check sequence 94 to the originating device. An exemplary combination would specify that an 8-bit CRC be sent in response to a fixed block message defined as 16 bytes; an 8-bit CRC for messages of this length would provide a high level of confidence in the integrity of the conveyed message.

Figure 4B:
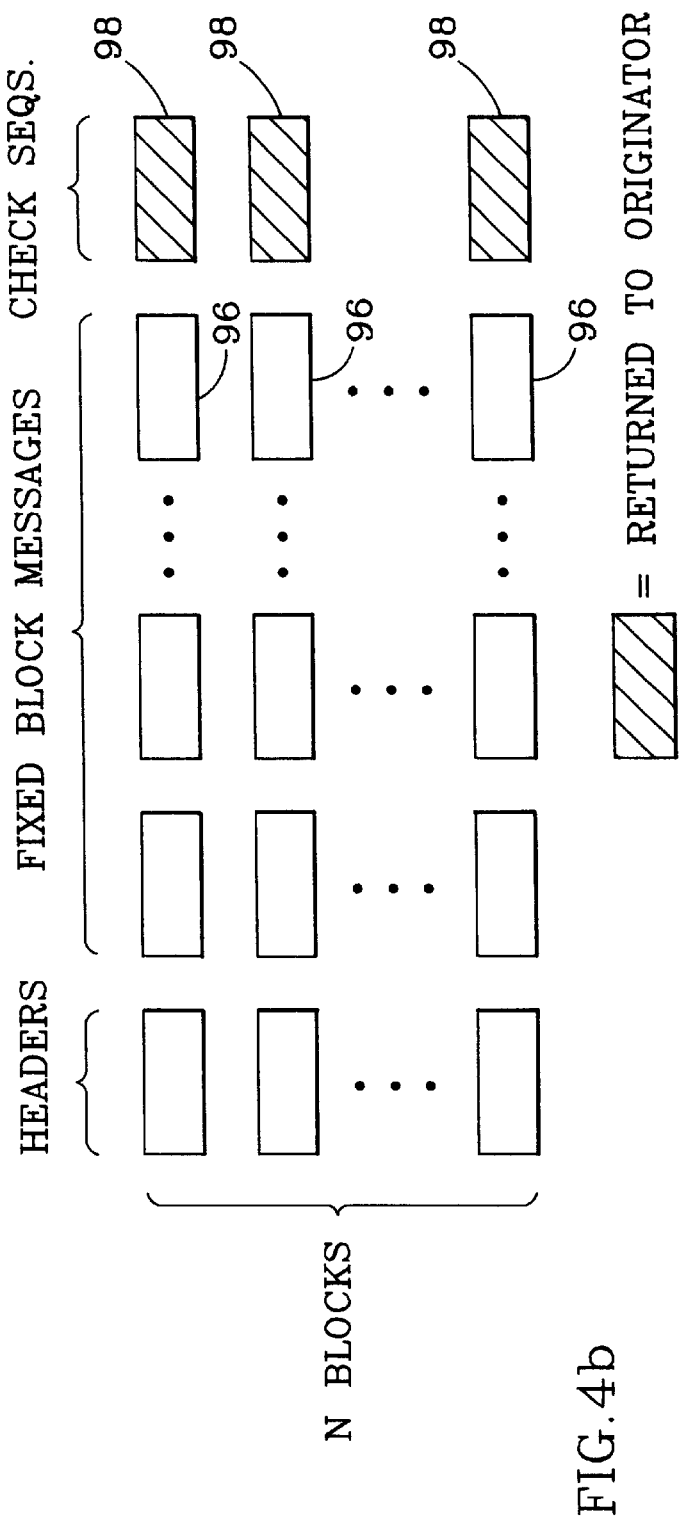

Multi-block fixed block messages can be similarly accommodated. As shown in FIG. 4b, a group of N fixed block messages 96 are conveyed between an originating device and a receiving device, with the number of blocks determined by an implicit contract between the two devices. To maintain high confidence in the integrity of the data, check sequences 98 are preferably returned after each fixed block message. For example, a receiving device that is requested to send 32 bytes of data to an originating device would send two 16-byte blocks, each accompanied by a respective check sequence. The advantage of this scheme is that hardware in the originating device can easily detect that the transmission between the devices was successful within the statistical reliability of the chosen check sequence. The originating device hardware can be constructed to independently repeat failed bus transactions without any higher level intervention.

Figure 5A:
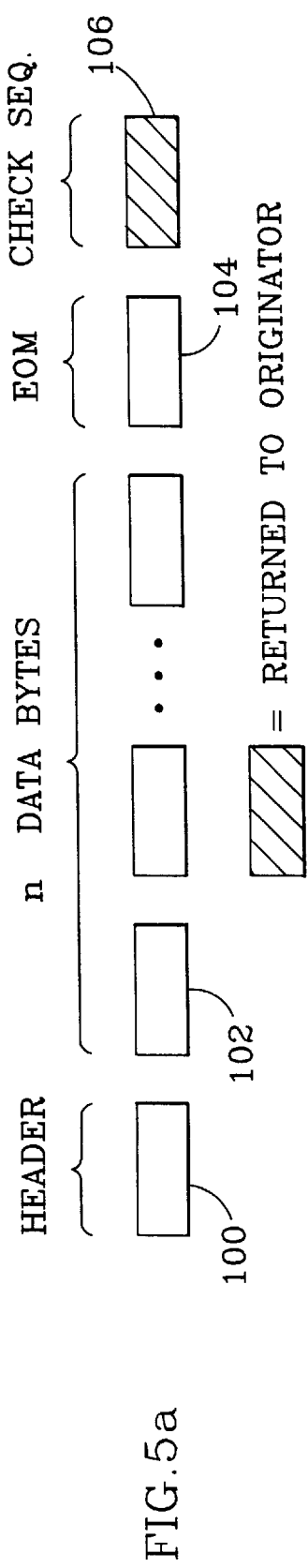
FIGS. 5a and 5b are diagrams of a variable length message and a multi-part variable length message, respectively, per the present invention.

A data bus system per the present invention can also include a variable length message protocol. As illustrated in FIG. 5a, a message includes a header 100 and n data bytes 102. The end of the message is preferably signaled by following the data bytes 102 with an End Of Message (EOM) token 104. A check sequence 106 is sent to the originating device following either the receipt of the EOM token (if a write operation) or the transmission of the EOM token (if a read operation).

Figure 5B:
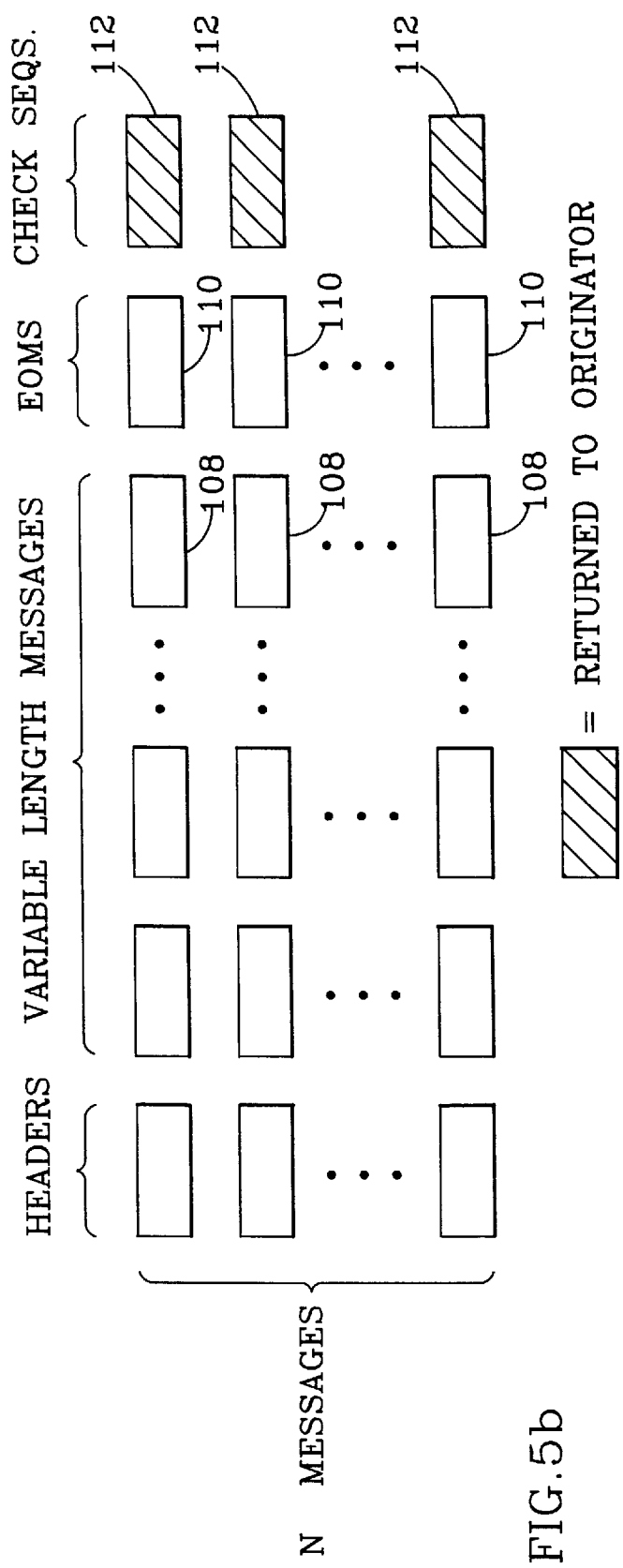

This protocol can be extended to accommodate multi-part variable length messages, as shown in FIG. 5b. A group of N variable length messages 108 are conveyed between an originating device and a receiving device, with each message terminated with an EOM token 110 and followed by a check sequence 112. In a read operation, for example, an originating device can receive data until it encounters the nth EOM token followed by a check sequence, with the number n of EOM tokens determined by an implicit contract between the two devices.

While particular embodiments of the invention have been shown and described, numerous variations and alternate embodiments will occur to those skilled in the art. Accordingly, it is intended that the invention be limited only in terms of the appended claims.

We claim:

1. A data bus system arranged to convey messages between devices connected to a data bus and to verify the integrity of the messages conveyed at the datalink layer of said bus, comprising:

a data bus for conveying messages between devices connected to said bus, a message originating device connected to said bus and arranged to initiate bus transactions with other devices connected to said bus, and at least one receiving device connected to said data bus and arranged to automatically send at least one multiple-bit check sequence to said originating device for each bus transaction conducted between said receiving device and said originating device, the bits of said at least one check sequence having a value which is dependent on the data conveyed during its associated bus transaction, said originating device further arranged to receive said at least one check sequence and use it to verify the integrity of the messages conveyed in said bus transaction such that the integrity of messages conveyed on said data bus are verified at the datalink layer of said bus.

2. The data bus system of claim 1, wherein said receiving device is arranged to automatically echo a check sequence received from said originating device back to said originating device, said echoed check sequence being said check sequence sent to said originating device for each bus transaction conducted between said receiving device and said originating device.

3. The data bus system of claim 1, wherein said originating device is arranged to append a check sequence to data conveyed to said receiving device and said receiving device is arranged to calculate a check sequence based on data received from said originating device, compare said calculated check sequence with said appended check sequence, automatically echo said appended check sequence back to said originating device when said calculated and appended sequences match, and automatically send a message indicating that said data was received incorrectly when said sequences do not match.

4. The data bus system of claim 1, wherein said bus transaction comprises a write operation, said data bus system arranged such that said originating device writes data to said receiving device, said receiving device automatically sends said check sequence to said originating device in response, and said originating device receives said responsive check sequence.

5. The data bus system of claim 1, wherein said check sequence is a cyclical redundancy code (CRC).

6. The data bus system of claim 1, wherein said check sequence is a checksum.

7. The data bus system of claim 1, wherein said check sequence is a longitudinal redundancy check (LRC).

8. The data bus system of claim 1, wherein said bus includes a plurality of said message originating devices, each of which can initiate bus transactions with other devices connected to said bus.

9. The data bus system of claim 8, wherein said check sequence is accompanied by a device address identifying which of said originating devices said check sequence is to be sent.

10. The data bus system of claim 1, wherein said data bus system is arranged to use a fixed block protocol in which bus transactions between said originating device and said receiving device include the conveyance of at least one fixed block message, said receiving device being arranged to automatically send respective check sequences to said originating device for each of said fixed block messages conveyed between said originating device and said receiving device.

11. The data bus system of claim 1, wherein said data bus system is arranged to use a variable length message protocol in which bus transactions between said originating device and said receiving device include the conveyance of at least one variable length message, the end of which is signaled by an end-of-message token, said receiving device being arranged to automatically send respective check sequences to said originating device for each of said variable length messages conveyed between said originating device and said receiving device.

12. A method of verifying the integrity of data conveyed between devices connected to a data bus at the datalink layer of said bus, comprising the steps of:

initiating a bus transaction with a receiving device, automatically sending a multiple-bit check sequence in response to said initiating of said bus transaction, the bits of said at least one check sequence having a value which is dependent on the data conveyed during its associated bus transaction, reading said check sequence, and verifying the integrity of said bus transaction using said check sequence such that the integrity of messages conveyed on said data bus are verified at the datalink layer of said bus.

13. The method of claim 12, wherein said bus transaction is initiated by an originating device and said receiving device responds by automatically sending said check sequence to said originating device, said step of reading said check sequence performed by said originating device.

14. The method of claim 13, wherein said step of automatically sending a check sequence is accomplished by echoing a check sequence received from said originating device during said bus transaction back to said originating device.

15. The method of claim 13, further comprising the steps of:

appending a check sequence to data sent from said originating device to said receiving device during said bus transaction, receiving said data and said appended check byte, calculating a check sequence based on said received data, comparing said calculated check sequence and said appended check sequence, echoing said appended check sequence back to said originating device if said calculated check sequence and said appended check sequence match, and sending a message back to said originating device indicating that said data was received incorrectly if said calculated check sequence and said appended check sequence do not match.

16. The method of claim 13, wherein said check sequence is accompanied by a device address identifying the originating device to which said check sequence is to be sent.

17. A method of verifying the integrity of data conveyed between devices connected to a data bus at the datalink layer of said bus, comprising the steps of:

initiating, by an originating device, a bus transaction with a receiving device, said originating and receiving devices connected to a data bus, sending, by said receiving device, a multiple-bit check sequence to said originating device for each bus transaction conducted between said originating and said receiving devices, the bits of said at least one check sequence having a value which is dependent on the data conveyed during its associated bus transaction, receiving, by said originating device, said check sequence sent from said receiving device, and verifying, using said check sequence, the integrity of the data conveyed between said originating and said receiving devices during said check sequence's associated bus transaction such that the integrity of messages conveyed on said data bus are verified at the datalink layer of said bus.

18. The method of claim 17, wherein said bus transaction is a write operation comprising the steps of:

sending data from said originating device to said receiving device, receiving said data by said receiving device, sending a check sequence from said receiving device to said originating device, receiving said check sequence by said originating device, and verifying the integrity of the data conveyed from said originating device to s aid receiving de vice using said check sequence.

19. The method of claim 17, wherein said check sequence is a cyclical redundancy code (CRC).

20. The method of claim 17, wherein said check sequence is a checksum.

21. The method of claim 17, wherein said check sequence is a longitudinal redundancy check (LRC).

22. The method of claim 17, wherein a bus transaction between said originating device and said receiving device includes the conveyance of at least one fixed block message, said receiving device automatically sending respective check sequences to said originating device for each of said fixed block messages conveyed between said originating device and said receiving device.

23. The method of claim 17, wherein a bus transactions between said originating device and said receiving device includes the conveyance of at least one variable length message, the end of which is signaled by said originating device sending an end-of-message token, said receiving device automatically sending respective check sequences to said originating device for each of said variable length messages conveyed between said originating device and said receiving device.

* * * * *